United States Patent [19]
Okamoto et al.

[11] Patent Number: 5,830,599
[45] Date of Patent: Nov. 3, 1998

[54] SEALED RECHARGEABLE BATTERY

[75] Inventors: Miho Okamoto, Sakai; Shinji Hamada, Hirakata; Hiroshi Inoue, Neyagawa; Munehisa Ikoma, Nara, all of Japan

[73] Assignee: Matsushita Electric Industrial Co. Ltd., Osaka, Japan

[21] Appl. No.: 738,967

[22] Filed: Oct. 24, 1996

[30] Foreign Application Priority Data

Oct. 24, 1995 [JP] Japan .................................. 7-275316

[51] Int. Cl.[6] ...................................................... H01M 2/04
[52] U.S. Cl. ........................ 429/163; 429/175; 429/120; 429/58
[58] Field of Search ................................ 429/58, 62, 163, 429/175, 120

[56] References Cited

U.S. PATENT DOCUMENTS

| | | | |
|---|---|---|---|
| 2,431,945 | 12/1947 | Little et al. | 429/62 |
| 4,007,315 | 2/1977 | Brinkmann et al. | 429/62 |
| 4,234,839 | 11/1980 | King et al. | 320/36 |
| 4,247,811 | 1/1981 | Findl | 320/35 |
| 5,298,347 | 3/1994 | Aksoy et al. | 429/98 |
| 5,378,552 | 1/1995 | Dixon, Jr. | 429/91 |
| 5,569,554 | 10/1996 | Tsenter | 429/57 |

FOREIGN PATENT DOCUMENTS

| | | |
|---|---|---|
| 0 312 940 | 4/1989 | European Pat. Off. . |
| 2 565 415 | 12/1985 | France . |
| 2 589 008 | 4/1987 | France . |
| 28 48 466 | 5/1979 | Germany . |
| 62-002457 | 1/1987 | Japan . |
| 63-281367 | 11/1988 | Japan . |
| 5-326024 | 12/1993 | Japan . |
| 53-26024 | 12/1993 | Japan . |
| 6-133468 | 5/1994 | Japan . |

OTHER PUBLICATIONS

Linden, Handbook of Batteries and Fuel Cells, McGraw–Hill Book Company, pp. 14–94. (No month available.), 1984.

European Searrch Report dated Mar. 7, 1997.

*Primary Examiner*—Prince Willis, Jr.
*Assistant Examiner*—Carol Chaney
*Attorney, Agent, or Firm*—Ratner & Prestia

[57] ABSTRACT

A long-life sealed rechargeable battery employing a plastic battery container in use for electric vehicles and the like, wherein at least one tube having the bottom is formed under the cover, the closed end of the tube is either brought as close as possible to the upper edge of the electrode group or put into direct contact with a lead tab of the positive or negative electrode, and a temperature sensor is inserted and fixed inside the tube in such a way that the temperature sensing part comes into direct contact with the inner surface of the closed end of the tube, thereby capable of measuring from the outside temperature variation in the cell so as to control charge and discharge.

15 Claims, 5 Drawing Sheets

SEALED RECHARGEABLE BATTERY

BACKGROUND OF THE INVENTION

1. Field of the Invention

The present invention relates to a sealed rechargeable battery, particularly to a sealed rechargeable battery provided with a temperature sensor that measures temperature inside the cell.

2. Description of the Prior Art

Recently, exhaust gas emitted from automobile engines has been a matter of concern from a viewpoint of environmental pollution. As a countermeasure, the development and practical use of electric vehicles (hereafter referred to as EV's) have been vigorously carried out in major countries all over the world.

The success in practical use of EV's depends on the availability of a good power supply battery which drives EV's.

The requirements for EV batteries are:

(1) high energy density, and small size and light weight
(2) long charge-discharge cycle life, and high economical efficiency
(3) easy maintenance A battery system which has been thus far mostly employed for the EV battery is, due to its comparatively low initial price, a lead-acid battery. In this lead-acid battery, the volume of electrolyte solution is starved so that in the over charge period gaseous oxygen produced at the positive electrode is absorbed by and disappears in the negative electrode, thereby facilitating hermetic seal and easy maintenance. However, no significant improvements have been seen in high energy density and long cycle life.

Consequently, sealed alkaline rechargeable batteries based on a nickel-cadmium system that has excellent output characteristics and a long cycle life and a nickel-metal hydride system that has as high an output and as long a cycle life as the nickel-cadmium system and has a high energy density have recently attracted much attention.

For EV batteries of these systems, in order to practically prolong the driving distance per one charge, a series- and/or parallel-connection of a plurality of comparatively large single cells, or module batteries having a series-connection in an integral structure of, for example, a nominal voltage of 6 V is used as an assembled battery of a desired nominal voltage and capacity.

For these EV batteries, a battery container consisting of a plastic case and cover that are made of polyethylene (hereafter referred to as PE) or polypropylene hereafter referred to as PP) or the like the main ingredient of which is polyolefin is mostly used because of its excellent mechanical strength such as shock-proof and vibration-proof, good chemical resistance, and high economical efficiency.

In order to save maintenance operations such as supplying water for electrolyte, a sealed rechargeable battery is generally designed and manufactured in such a way that the negative electrode capacity is larger than the positive electrode capacity, so that in the time from the end of charge to over charge gaseous oxygen produced at the positive electrode is absorbed by and disappears at the negative electrode and consequently in the normal condition the internal pressure does not go up to a specified value. In order to prevent an abnormal increase of cell internal pressure, each cell is provided with a safety valve.

The reaction during over charge wherein gaseous oxygen is absorbed by and disappears at the negative electrode, as described above, is a heat generating reaction during which the temperature inside the cell increases. Particularly in a nickel-metal hydride system that employs a hydrogen absorbing alloy for the negative electrode, the reaction wherein by means of charge hydrogen is absorbed into the hydrogen absorbing alloy to form a hydride is also a heat generating reaction and consequently the temperature increases much higher than in any other battery systems. Much higher temperature would make the rechargeable battery so deteriorated that it could not recover.

In various sealed rechargeable batteries, therefore, several means are taken not to continue unlimited overcharging, partly because of saving electric power. For example, in a lead-acid system, a constant current-constant voltage charging method is mostly employed wherein charge is carried out at an almost constant current up to a specified voltage, then when the charging voltage of the cell reaches a specified voltage, it is switched to a constant voltage charge thereby decreasing a charging current.

On the other hand, in a nickel-cadmium system, in the case of a constant current charge by a low rate such as during an over night charge, heat generation during charge time is not so vigorous and charge without control is generally employed.

In the case of a quick charge by a high-rate equal to or more than 1 C, however, as charge proceeds, the cell voltage increases, and when it enters the over charge region it has been recommended to employ a $-\Delta V$ control system that makes use of the fact that the increased temperature in the cell, as previously described, allows the charge voltage to decrease. In this case, around the end of the charge, when a voltage drop of about 5 mV/cell is observed after reaching a voltage peak, charge is either continued at a trickle current of about $\frac{1}{20}$ C or stopped.

In a nickel-metal hydride system, there are problems that the temperature increase due to over charge, regardless of the charge rate, makes the surface of hydrogen absorbing alloy powder of the negative electrode oxidized, thereby deteriorating its hydrogen absorption capability and forcing the gas pressure in the cell to increase by gaseous hydrogen.

Over charge therefore has to be avoided as much as possible, but considering that in a nickel-metal hydride system no $-\Delta V$ phenomenon is clearly observed as in a nickel-cadmium system and that even over charge during the action of the $-\Delta V$ control system gives rise to deterioration, a method has been employed which ensures that as soon as a temperature increase is sensed, charge is stopped thereby avoiding over charge.

The method that avoids over charge by sensing temperature has been applied to other battery systems as well as the nickel-metal hydride system in order to improve reliability, and has been sometimes employed together with another control system.

A sealed lead-acid rechargeable battery wherein a temperature sensor is provided which is capable of measuring temperatures inside the cell from the outside to control charge is disclosed, for example, in Japanese Laid-Open Patent Application No. Sho 63-281367. Its specification describes that the sensing part of a temperature sensor is brought into contact with the central part of a group of electrode plates and separators, or a position capable of measuring in a correct way temperature variation, such as the main part of an electrode grid, and the portion of the cover through which its connection lead wire passes through is hermetically sealed.

However, when the cell container comprises a case and a cover that are made of plastics, the main ingredient of which is non-polar polyolefin, such as PE and PP, no appropriate adhesive agent is available and it is thus difficult to keep the container hermetically sealed for a long term.

Taking into account these situations, some examples of a sealed nickel-metal hydride rechargeable battery wherein a temperature sensor is provided inside a single cell at the central part of a module battery where the temperature is highest inside the cell, or is provided on the outer surface of the case of the single cell are disclosed in Japanese Laid-Open Patent Application No. Hei 5-326024 and other examples wherein a temperature sensor is buried in the electrode terminal, or attached on the upper surface of the electrode terminal thereafter being covered with heat resisting material, or sealed in the PP tube disposed inside the case are disclosed in Japanese Laid-Open Patent Application No. Hei 6-133468.

In the case that a temperature sensor is provided on the surface of the case, although a hermetic seal is maintained, the fact that the thermal conductivity of the plastic case is low results in a slow response to temperature variation inside the cell, allowing a time lag in the measured values of temperature.

In the case that a temperature sensor is fixed to the battery terminal, the fact that the metal terminal has a high thermal conductivity results in a significantly fast response to temperature variation, but the measured values of temperature is affected by the ambient temperature. This effect is avoided by covering it with heat insulating material, but this gives rise to another problem that it constrains emission of heat produced inside the cell toward the outside.

In the case that a temperature sensor is sealed inside a PP tube disposed inside the cell, it would give a good chemical resistance, but, as described previously, it has a drawback that it would be difficult to obtain a liquid-tight seal between a lead wire connected to the temperature sensor and the PP tube.

A sealed rechargeable battery according to the present invention employs a battery container comprising a case and a cover that are made of plastics comprising a non-polar polyolefin such as PE, PP and the like, which is superior in mechanical strength, chemical resistance and economical efficiency; wherein a tube having a bottom end which is closed beneath the cover protruding toward the inside of the cell is formed to make an integral structure with the cover, and a temperature sensor is inserted and fixed so that the sensing part is in direct contact with the internal surface of the closed end of the tube having the bottom, thereby maintaining a highly reliable, long-lasting hermetic seal and permitting the control of charge and discharge by monitoring temperature variations inside the cell from outside the cell with reduced time lag between the temperature inside and outside the cell.

SUMMARY OF THE INVENTION

The present invention is a sealed rechargeable battery employing a plastic battery container comprising a case and a cover, wherein an electrode group comprising positive electrode plates and negative electrode plates therebetween inserted by separators is contained in the case, a specified volume of electrolyte is immersed into the electrode group, a positive pole and a negative pole connecting respectively to lead tabs of the positive plate and the negative plate of the electrode group and a safety valve are provided in gas-tight and liquid-tight arrangement with the cover, and the fitting portion of the cover and the upper open edge portion of the case are joined to form an integral structure; characterized in that, at least one tube having the bottom that protrudes toward inside the cell is joined to the cover to form an integral structure, the closed end of the tube is brought as close as possible to the upper central part of the electrode group or put into direct contact with the lead tab of the positive or negative plate, and a temperature sensor is inserted and fixed inside the tube so that the temperature sensing part comes into direct contact with the inner surface of the closed end of the tube, thereby being capable of maintaining a highly reliable, long-lasting hermetic seal while simultaneously permitting control of the state of charge and discharge by monitoring temperature variation in the cell from outside the cell with reduced lag time, thus extending the life of the battery.

The present invention is applicable to any battery system, but is effective particularly to a nickel-metal hydride system which employ a hydrogen absorbing alloy for the negative electrode that is susceptible to deterioration caused by temperature rise, created by over charging such that it could not recover.

DETAILED DESCRIPTION OF THE PREFERRED EMBODIMENT

Figure 1:
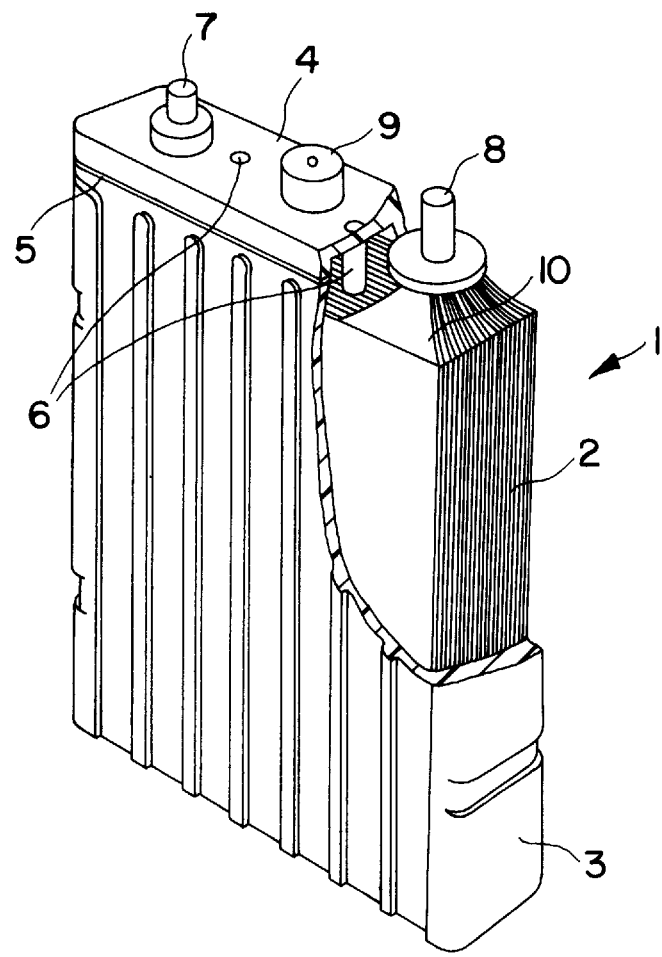
FIG. 1 is a perspective view, partly exposed, of a sealed rechargeable single cell according to the present invention.

A sealed rechargeable battery according to the present invention will be explained in detail with a nickel-metal hydride system as an example, referring to the drawings. As used throughout the specification and claims, the word "integral" defines the connection between specified elements as being established by forming the elements together with or attaching the elements to each other.

Figure 2A:
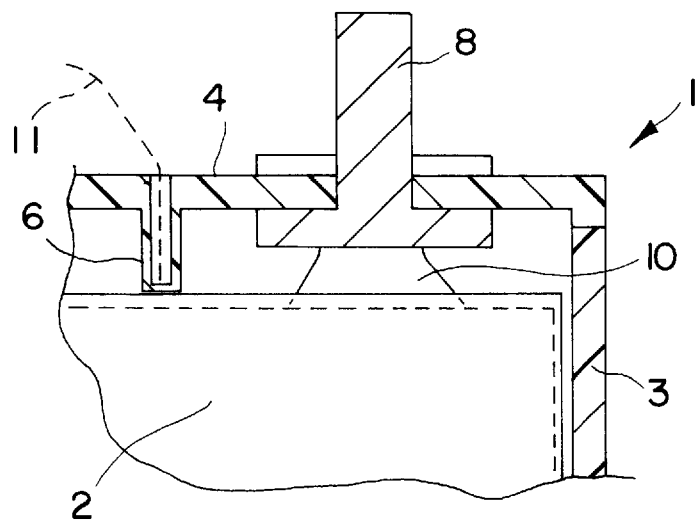
FIG. 2A is a cross sectional view of the single cell shown in FIG. 1.

FIG. 1 is a perspective view, partly exposed, of a sealed rechargeable single cell 1 based on nickel-metal hydride system according to the present invention. FIG. 2A is a cross-sectional view of single cell 1. The construction of single cell 1 is described below.

Positive electrode plates are fabricated from a positive active material mixture mainly containing nickel hydroxide which is filled in a formed nickel sheet having high porosity. The sheet is then dried rolled and cut, to make positive electrode plates each of which having a capacity of 8 Ah.

Negative electrode plates are fabricated by coating both sides of a nickel plated and punched steel sheet with a paste which is prepared by mixing hydrogen absorbing alloy powder represented by Mm $Ni_{3.6}$ $Co_{0.7}$—$Mn_{0.4}$ $Al_{0.3}$ (Mm: misch metal ) with a binder solution. After drying, the sheet is rolled and cut, thus fabricating negative electrode plates each of which having a capacity of 12 Ah.

Each of the positive and negative electrode plates is inserted into a bag-shaped separator that is made with PP fiber non-woven cloth with lead tabs having been welded to the positive and negative electrode plates beforehand. A plurality of positive and negative electrode plates each contained in a separator are piled up by turns to form an electrode group 2. Lead tabs 10 for the positive and negative electrodes are welded to nickel-plated steel positive and negative poles 7 and 8, respectively. This electrode group 2 is contained in a rectangular case 3 which is made of plastics containing PP as a main ingredient.

The open upper edge portion of the case 3 is bonded with the fitting portion beneath a cover 4 which is made of the same material as the case 3 in an integral form by a thermal melting method and the like. In this state, the positive and negative electrode poles 7 and 8 are inserted through the cover 4, thereby being aligned. The mechanical strength of the bonded part 5 has at least 95% of the strength of the parent material. As defined throughout, the strength of the parent material means the tensile strength of the plastic form containing PP as a main ingredient. 170 cm$^3$ of an electrolyte is injected via a through-hole provided for a safety valve 9 located on the center portion of the cover 4. The electrolyte used is 40 grams of lithium hydroxide crystal LiOH.H$_2$O dissolved in 1.0 liter of 27% potassium hydroxide aqueous solution. Although a little free electrolyte is noticed in the bottom of the cell immediately after injection, the discharge following the initial charge after the fabrication of the cell allows the electrolyte to be absorbed and immersed into the electrode group 2, the free electrolyte being thereafter not observed. After injection the positive and negative electrode poles 7 and 8 are fixed to the cover 4 in a gas-tight and liquid-tight.

Then, the cover 4 and the safety valve 9 arrangement is made of the same material as the case 3 and the cover 4 are bonded together to form an integral structure by a bonding method such as an ultrasonic melting method or the like to form a hermetic seal, a single cell thus being fabricated. Here, the poles 7 and 6 protruding above the cover 4 serves as terminals of the positive and negative electrodes, respectively, too. The safety valve 9 is a resealable type, and its operating pressure is set in the range from 2.0 to 8.0 kgf●cm$^{-2}$(0.20 to 0.78 M Pa).

At least one tube 6 having the bottom protruding toward the upper surface of the electrode group 2, located between the safety valve 9 and the positive electrode pole 7 or the negative electrode 8, are formed beneath the cover in an integral structure with the cover 4. The tube 6 and the cover 4 may be formed in an integral structure by injection molding, or the open upper edge portions of the tube having the bottom prepared beforehand and made from the same material as the cover 4 and portions of the undersurface of the cover which are peripheral to through-holes drilled at specified positions of the cover 4 may be bonded together in an integral structure by an ultrasonic method or the like.

A thermistor or a thermocouple is used for a temperature sensor 11 that is to be inserted and fixed in the tube 6.

In order to measure temperature variations of the electrode group, the temperature sensitive part of a temperature sensor primarily has to be inserted and fixed in the electrode group that serves as a heat source. However, if a temperature sensor, that is not associated with an electrochemical reaction brought about by charge and discharge and that could be regarded as a foreign substance, is inserted in the electrode group, then it would result in the breakdown of separators or a failure such as a non-uniform charge and discharge reaction.

Figure 2B:
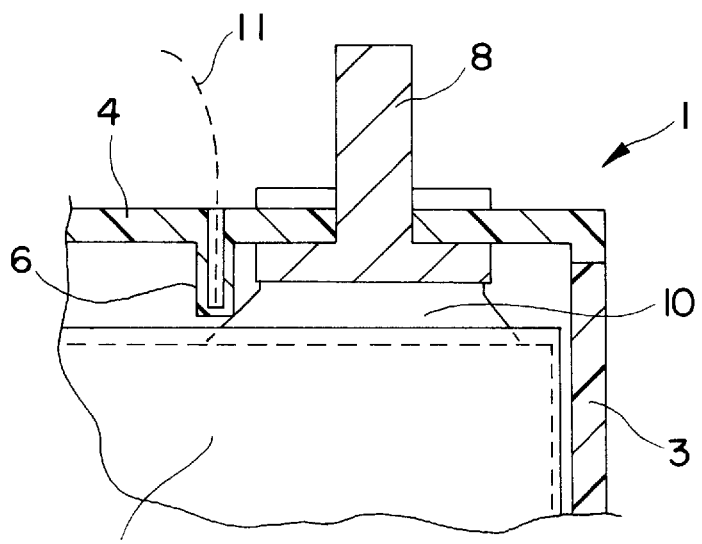
FIG. 2B is a cross sectional view of a single cell in accordance with a further embodiment of the present invention.

In one embodiment of the present invention, therefore, as shown in FIG. 2A, the pointed end of the tube 6 having the bottom is brought as close as possible to the upper edge of the separators that is slightly higher than the upper edge of the positive and negative electrode plates inside the electrode group 2. In another embodiment of the present invention, as shown in FIG. 2B, the closed end of the tube 6 is placed in direct contact with the lead tab 10 of the positive or negative plates. FIGS. 2A and 2B show, in phantom, a temperature sensor 11 inserted into and fixed inside tube 6.

Test cells were subject to an initial charge at a constant current of 10 A and 25° C. followed by a discharge at a constant current of 20 A until to 1.0 V, then their standard capacities were measured. The discharge capacity of the test cells is 100 Ah being limited by the positive electrode capacity.

Four test cells were prepared and subjected to an initial charge followed by a complete discharge. The same thermistor was used in different locations and with different fixing methods to study difference in temperature variation in the test cells, as discussed below.

The 4 test cells incorporating the thermistor are as follows:

(1) Cell A according to the present invention: the thickness of the tube having the bottom is 1.0 mm, and the outer surface of the pointed end of the tube, the inner surface of the closed end to which the temperature sensing part is inserted to and fixed on, is put into contact with the upper edge of the separators in the electrode group.

(2) Cell B according to a conventional means: the temperature sensing part is fixed on the outer surface of the case 30 mm from under the bonded part of the case and the cover.

(3) Cell C according to another conventional means: the temperature sensing part is buried in the upper part of the positive electrode pole (terminal).

(4) Cell D according to a still another conventional means: adjacent to the tube having the bottom and in the direction to the positive electrode pole, a hole is drilled, and the temperature sensing part is fixed so as to come into contact with the upper edge of the separators in the electrode group, thereafter the through-hole is sealed with blown-asphalt.

Each cell was subject to charge at a constant current of 10 A for 10 h (100 Ah) at 25° C. The measurement result of the temperature variation versus charge time is shown in FIG. 3.

Figure 3:
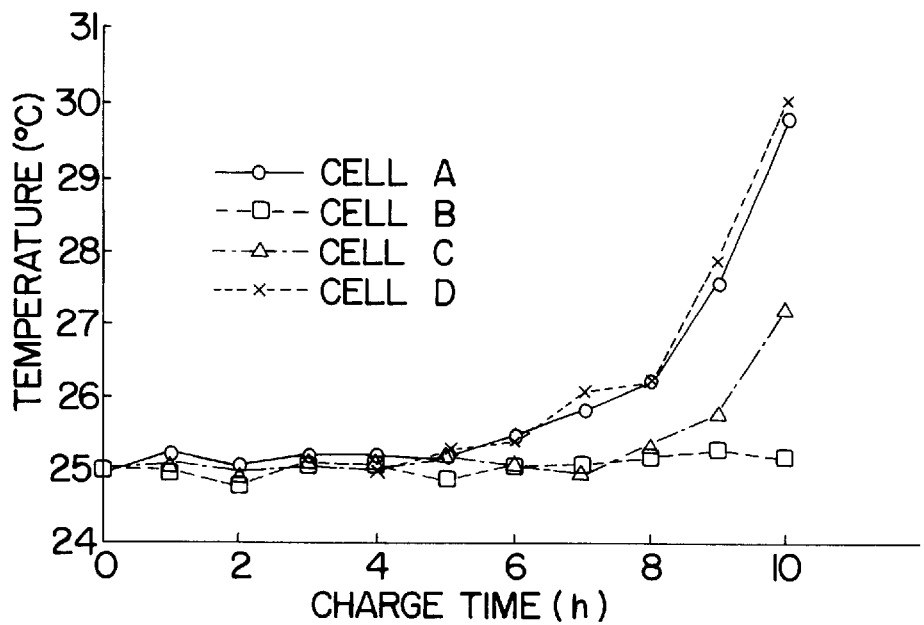
FIG. 3 shows the temperature variation in a test cell during low-rate charge at 25° C.

FIG. 3 shows that both cell A according to the present invention and cell D according to a conventional means exhibit the similar temperature increase curve which follows from the fact that the temperature sensing part in both test cells is located almost in the same position.

On the contrary, cell C according to a conventional means wherein the temperature sensing part is buried in the upper part of the electrode pole shows a slower temperature increase, presumably resulting from the radiation of heat by the effect of the ambient temperature.

Cell B shows a still slower response, as is expected from the low thermal conductivity of the plastic case.

Figure 4:
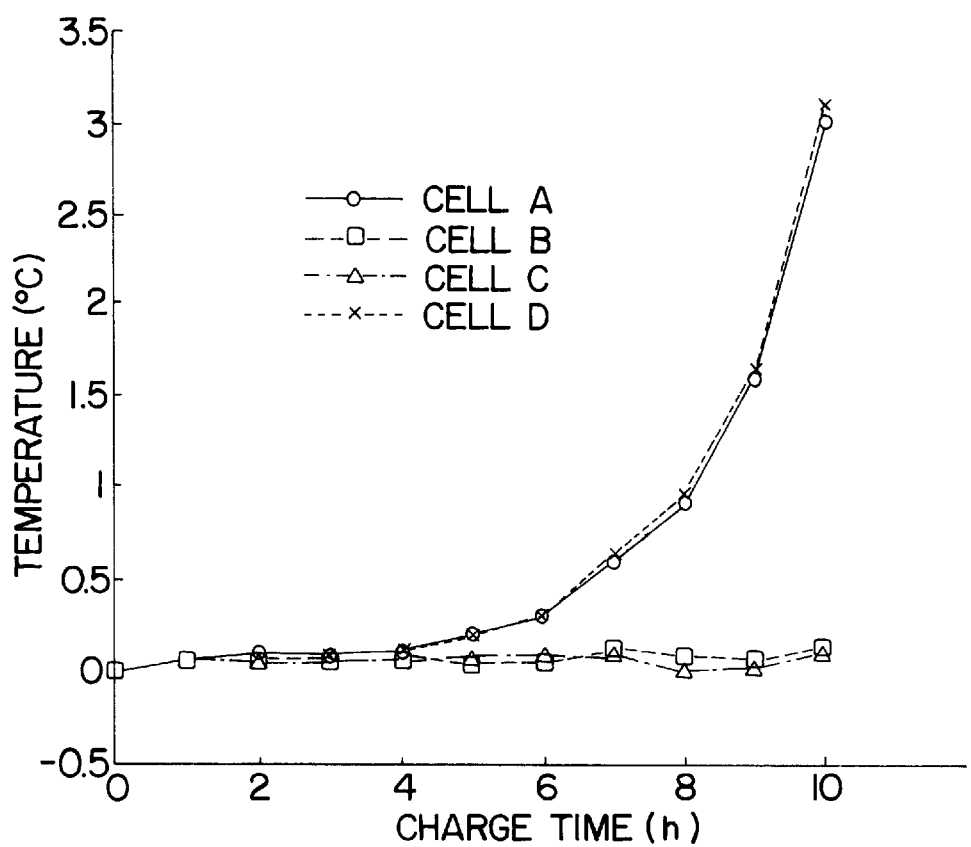
FIG. 4 shows the temperature variation in a test cell during low-rate charge at 0° C.

After being completely discharged, each cell was charged at a constant current of 10 A and a temperature 0° C. for 10 h. The temperature variation versus charge time is shown in FIG. 4. As in the case of charge at 25° C., FIG. 4 shows that both cell A according to the present invention and cell D according to a conventional means behave in a similar way, but cell C according to a conventional means exhibits no significant temperature increase. The reason is that the ambient temperature is so low that heat radiates efficiently, therefore it is concluded that fixing the temperature sensing part on the outside of the cell is not appropriate for detecting the temperature increase during charge with a good response.

Figure 5:
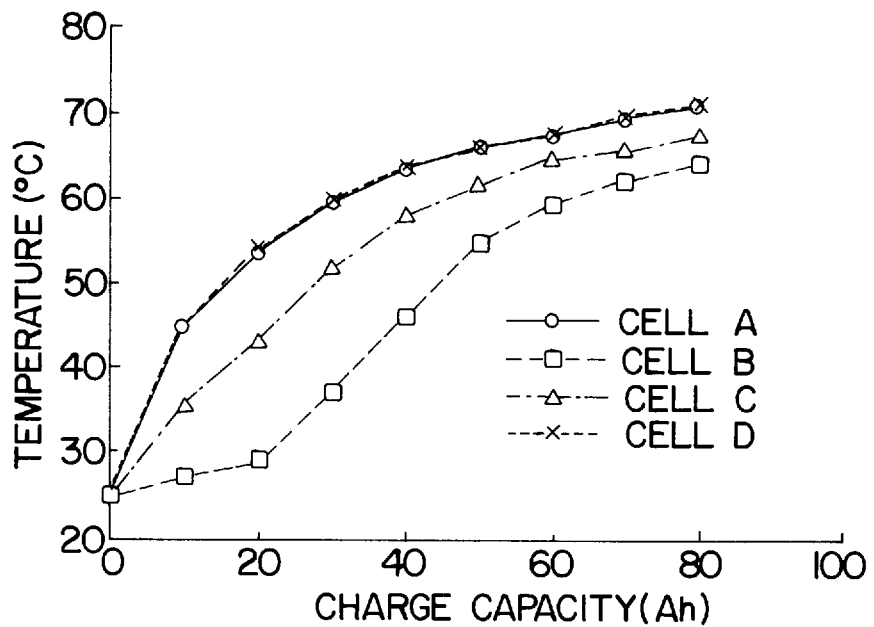
FIG. 5 shows the temperature variation in a test cell during high-rate charge at 25° C.

Furthermore, after being completely discharged, each cell was charged at 25° C. and a high rate of 100 A constant current for 0.8 h (80 Ah). The temperature variation of each cell is shown in FIG. 5. FIG. 5 shows that the temperature increase of each cell is faster than in the case of low-rate charge.

Cells A and D exhibit the similar curve. The effect of the ambient temperature in cell C as well as the low thermal conductivity of the plastic case in cell B is observed as in FIGS. 3 and 4, therefore it can be understood that the conventional means thereby fixing the temperature sensing part on outside the cell is problematical.

Cell A according to the present invention and cell D according to a conventional means, which exhibited almost similar temperature characteristics in the experiments hitherto, were subject to a cycle life test wherein they were repeatedly charged at 25° C. and a constant current of 20 A either for 5.25 h (105 Ah) or until reaching a cell internal pressure of 0.15 M Pa (1.53 Kgf cm$^{-2}$) and thereafter discharged at a constant current of 50 A until to 1.0 V. Since the operating pressure of the safety valve was, as described before, fixed in the range from 0.20 to 0.78 M Pa, a cell internal pressure of 0.15 M Pa was set to avoid the situation that the safety valve bleeds, gas inside the cell disperses and the electrolyte decreases.

The cycle life test was continued until the capacity decreased to 60% of the initial standard capacity of 100 Ah.

Figure 6:
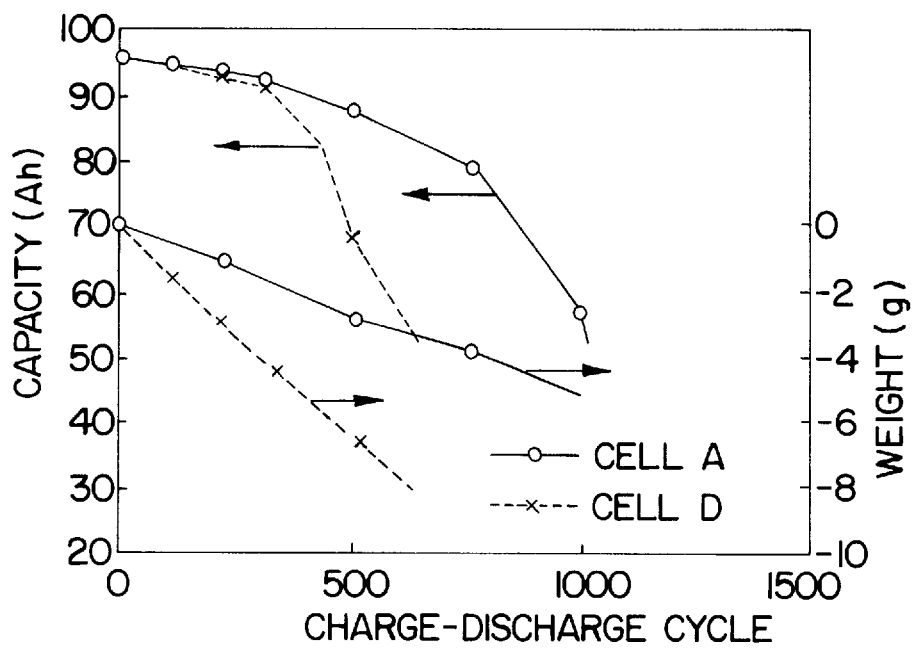
FIG. 6 shows the capacity and weight changes of cells during charge-discharge cycle.

The capacity and weight variations of each cell as a function of charge-discharge cycle are shown in FIG. 6. FIG. 6 shows that cell A according to the present invention loses weight less than cell D according to a conventional means and its cycle life exceeds 1000 cycles, while cell D according to a conventional means decreases in capacity as it loses weight and its life cycle is only 600 cycles.

It is presumed that sealing of the through-hole of the cover provided for inserting the thermistor is not perfect in cell D, and for this reason, even though under lower than the operating pressure of the safety valve, gas leaks from the cell and the volume of the electrolyte decreases.

In other words, cell A according to the present invention with its simple structure maintains the state of hermetic seal in high reliability and for a long time, thereby prolonging the cycle life.

Next, a study was carried concerning the distance, from the closed end of the tube having the bottom that is formed in an integral structure with the cover according to the present invention, to the upper edge of separators in the electrode group. The distance was varied from 0 (in contact), 1, 2, through 3 mm, and after being completely discharged, the cells were charged at 25° C. and a constant current of 10 A for 10 h (100 Ah), and the thicknesses of the tubes were all 1.0 mm. The temperature variation as a function of distance is shown in FIG. 7.

Figure 7:
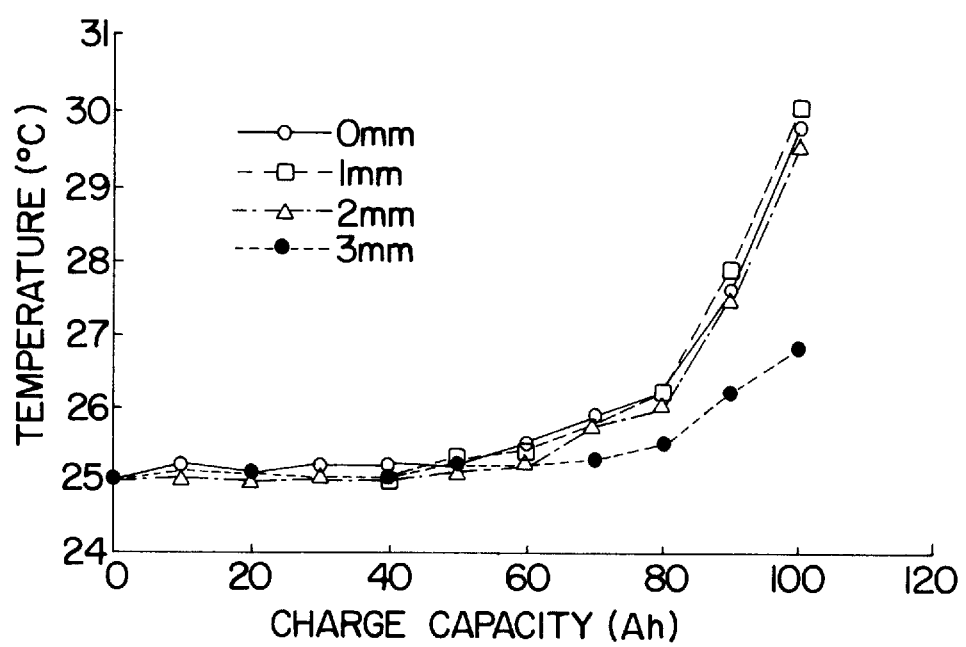
FIG. 7 shows the temperature variations during charge as a parameter of the distance between the closed end of the tube and the upper surface of the electrode group.

FIG. 7 shows that as long as the distances are not longer than 2 mm, their measured values of temperature were almost alike. If the distance is 3 mm, there arises a delay in the measured values of temperature, suggesting a slow response. Therefore it is understood that it is preferable that the closed end of the tube is positioned within 2 mm from the upper edge of separators in the electrode group or is brought as close as possible to that upper edge.

The thicknesses of the tubes thus far are all 1.0 mm, but it is preferable that they are kept as thin as possible. However, this thickness should be decided from the standpoint of mechanical strength which affects ease of handling and formability of the tube during fabrication with approximately 0.5 mm in thickness being preferred.

The tube according to the embodiment of the present invention is, as described in detail, formed in an integral structure between the safety valve and the electrode poles under the cover and the closed end of the tube is brought as close as possible to the central upper edge of the electrode group, but the closed end may be put into direct contact with a rigid body such as the lead tabs of the positive and negative electrodes provided contact with the body does not cause breakdown of the separators.

There was no significant difference in measured temperature values whether the tube is located between the safety valve and the positive electrode pole or between the safety valve and the negative electrode pole. Analysis by a thermograph method of temperature distribution in the cell during charge and discharge confirmed that there is no significant difference in temperature between the lead tabs of the positive and negative electrodes and the upper edge of the electrode group. Heat generation during charge is caused not by an electrochemical reaction but mainly by Joule' heat of ohmic resistance, and by using the measuring locations described above the temperature measurement can be carried out in a reproducible way.

According to the present invention, a temperature sensor has to be preferably provided to each cell. If a temperature sensor is to be fixed to a particular cell in a module battery or an assembled battery, it has to be located in a cell in the central position that undergoes less heat radiation. Upon reaching a specified temperature during charge, a charge current is to be stopped. If the specified temperature is exceeded, the cell should be cooled down by an air or water cooling method to maintain a good cycle life even in a high rate discharge as in EV and enabling a continuous discharge.

A rectangular sealed rechargeable battery based on nickel-metal hydride system has thus far been described in detail, however, the application of the present invention is not restricted to that battery system, but also includes a sealed rechargeable battery employing a plastic battery container based on, for example, a lead-acid system, a nickel-cadmium system and the like. Although the description above has been with respect to a single cell battery, one of ordinary skill in the art would recognize that the present invention could readily be implemented in a multiple cell battery.

The present invention can be, furthermore, applied to a cylindrical cell that forms the electrode group in such a way that a piece of positive electrode plate and a piece of negative electrode plate therebetween inserted with a separator are spirally rolled, with the closed end of the tube having the bottom under the cover being brought as close as possible to the portion of the central upper edge of the electrode group where temperature increases fastest.

As described above, the present invention provides a long-life sealed rechargeable battery that has a simple structure, which remains hermetically sealed for a long time and with high reliability, and facilitates measuring temperature in the cell from outside the cell in a good response for controlling charge and discharge.

What is claimed:

1. A sealed rechargeable battery comprising:
a plastic battery container having a case and a cover, said case having disposed therein:
an electrode group having an first edge and comprising a plurality of alternating positive electrode plates and negative electrode plates, said positive plates and said negative plates each having lead tabs,
a plurality of separators disposed between each of said alternating positive and negative electrode plates, and
a volume of electrolyte
said cover having a safety valve, a positive pole, and a negative pole integrally mounted in a gas-tight and liquid tight relationship therein, wherein said positive pole and said negative pole are connected respectively to said lead tabs of the plurality of positive plates and the negative plates of the electrode group;
at least one tube having a first end and a closed second end with an inner surface, wherein said first end is integral with said cover and said closed second end protrudes toward said electrode group; and
a temperature sensor inserted inside the tube; said temperature sensor having a temperature sensing part in direct contact with the inner surface of the closed end of the tube.

2. A sealed rechargeable battery according to claim 1, wherein the battery container having a case and a cover comprises a polyolefin.

3. A sealed rechargeable battery according to claim 2, wherein said polyolefin is selected from the group consisting of at least one of polyethylene and polypropylene.

4. A sealed rechargeable battery according to claim 1, wherein the tube is formed together with the cover in an integral structure.

5. A sealed rechargeable battery according to claim 2, wherein the tube is formed together with the cover in an integral structure.

6. A sealed rechargeable battery according to claim 1, wherein the first end of the tube is joined to the cover and is axially in line with a through hole which is drilled in the cover.

7. A sealed rechargeable battery according to claim 2, wherein the first end of the tube is joined to the cover and is axially in line with a through hole which is in the cover.

8. A sealed rechargeable battery according to claim 1, wherein the distance between the closed end of the tube and the first edge of the electrode group is not longer than 2 mm.

9. A sealed rechargeable battery according to claim 2, wherein the distance between the closed end of the tube and the first edge of the electrode group is not longer than 2 mm.

10. A sealed rechargeable battery according to claim 4, wherein the distance between the closed end of the tube and the first edge of the electrode group is not longer than 2 mm.

11. A sealed rechargeable battery according to claim 6, wherein the distance between the closed end of the tube and the first edge of the electrode group is not longer than 2 mm.

12. A sealed rechargeable battery comprising:
a container;
an electrode group disposed in said container comprising a plurality of alternating positive electrode plates and negative electrode plates
at least one tube having a first end integral with said container and a closed second end which protrudes toward said electrode group,
a temperature sensor inserted inside the tube; said temperature sensor having a temperature sensing part in direct contact with the inner surface of the closed end of the tube.

13. A sealed rechargeable battery according to claim 12, wherein the tube is formed together with the container as a single piece.

14. A sealed rechargeable battery comprising:
a container;
an electrode group disposed in said container comprising a plurality of alternating positive electrode plates and negative electrode plates, said positive plates and said negative plates each having a lead tab;
at least one tube having a first end integral with said container and a closed second end which contacts at least one of said lead tabs of said positive and negative plates; a temperature sensor inserted inside said tube and in direct contact with the tube.

15. A sealed rechargeable battery according to claim 14, wherein the tube is formed together with the container as a single piece.

* * * * *